United States Patent
Chan et al.

(10) Patent No.: US 8,035,778 B2
(45) Date of Patent: Oct. 11, 2011

(54) DISPLAY PANEL, ELECTRO-OPTICAL APPARATUS AND FABRICATING METHODS THEREOF

(75) Inventors: Chih-Cheng Chan, Taipei (TW); Sheng-Wen Cheng, Changhua (TW)

(73) Assignee: Au Optronics Corporation, Hsinchu (TW)

( * ) Notice: Subject to any disclaimer, the term of this patent is extended or adjusted under 35 U.S.C. 154(b) by 365 days.

(21) Appl. No.: 12/469,665

(22) Filed: May 20, 2009

(65) Prior Publication Data
US 2010/0238389 A1    Sep. 23, 2010

(30) Foreign Application Priority Data
Mar. 20, 2009    (TW) .............................. 98109177 A

(51) Int. Cl.
*G02F 1/1335*    (2006.01)
(52) U.S. Cl. ................. 349/107; 349/104; 349/109
(58) Field of Classification Search .................. 349/104, 349/106–109
See application file for complete search history.

(56) References Cited

U.S. PATENT DOCUMENTS

| | | | |
|---|---|---|---|
| 2002/0030780 A1* | 3/2002 | Nishida et al. | 349/141 |
| 2006/0208293 A1 | 9/2006 | Lim et al. | |
| 2006/0227264 A1* | 10/2006 | Noda | 349/108 |

FOREIGN PATENT DOCUMENTS

| | | |
|---|---|---|
| CN | 1270326 | 10/2000 |
| CN | 1834703 | 9/2006 |
| CN | 1892321 | 1/2007 |
| JP | 07175050 | 7/1995 |
| JP | 11014978 | 1/1999 |
| JP | 2003050388 | 2/2003 |
| JP | 2005-084229 | 3/2005 |

OTHER PUBLICATIONS

"1st Office Action of China counterpart application", issued on Mar. 18, 2010, p. 1-p. 3.

* cited by examiner

*Primary Examiner* — Rhonda Peace
(74) *Attorney, Agent, or Firm* — Jianq Chyun IP Office

(57) ABSTRACT

A display panel including a pair of substrates, a color filter layer, and a display medium is provided. The substrates including a plurality of pixels, wherein each pixel at least having a first sub-pixel, a second sub-pixel, a third sub-pixel, and a fourth sub-pixel. The color filter layer is disposed on one of the substrates and at least has a first color filtering pattern disposed in the first sub-pixel, a second color filtering pattern disposed in the second sub-pixel, a third color filtering pattern disposed in the third sub-pixel, and a fourth color filtering pattern disposed in the fourth sub-pixel. The display medium is disposed between the pair of substrates, wherein the display medium correspondingly disposed in the first sub-pixel, the second sub-pixel, the third sub-pixel, and the fourth sub-pixel has thicknesses of T1, T2, T3 and T4, respectively, and T1>T2>T3 and T1>T4>T3.

18 Claims, 14 Drawing Sheets

DISPLAY PANEL, ELECTRO-OPTICAL APPARATUS AND FABRICATING METHODS THEREOF

CROSS-REFERENCE TO RELATED APPLICATION

This application claims the priority benefit of Taiwan application serial no. 98109177, filed on Mar. 20, 2009. The entirety of the above-mentioned patent application is hereby incorporated by reference herein and made a part of specification.

BACKGROUND OF THE INVENTION

1. Field of Invention

The present invention relates to a display panel, an electro-optical apparatus, and fabricating methods thereof. More particularly, the present invention relates to a display panel, an electro-optical apparatus, the display panel, the electro-optical apparatus including sub-pixels with display medium of different thicknesses, and fabricating methods thereof.

2. Description of Related Art

Due to the advancement in the technology of electro-optical and semiconductor devices, the development of flat screen displays progresses expeditiously. Among the various flat screen displays, the liquid crystal display (LCD) provides the favorable features of high space-utilization efficiency, low power consumption, free radiation and low electric field interference, etc.; hence, liquid crystal displays have become increasingly popular and accordingly becomes the mainstream of flat screen displays.

In a conventional liquid crystal display, the back light is designed as a white light. As the white light source enters into the liquid crystal panel and passes through the color filters respectively disposed at each pixel, the color of each pixel is displayed. Further, in the conventional liquid crystal display, a color filter layer, constituted with photo-resists of three colors such as Red (R), Green (G) and Blue (B), is disposed on each pixel. Wherein the thickness of the photo-resists of three colors such as Red (R), Green (G) and Blue (B) is the same each other (is identical each other). Further, the parts of the pixel that correspond to the positions of the three colors such as Red (R), Green (G) and Blue (B) are known as sub-pixels. Wherein the thickness of the photo-resists of three colors such as Red (R), Green (G) and Blue (B) is the same each other (is identical each other). The array of colors that are perceivable by human eyes can be obtained by mixed-matching the three colors at different gradations. The combination of the three colors at the brightest intensity (fully on) gives the white color, while zero intensity for each color (fully off) gives the black color. Between the darkest (black) and the brightest (white), the array of colors is divided into a plurality of gray levels according the color gradation.

However, as the light beams enter the color filter layer, only one-third of the light passes through and departs from the color filter layer. In other words, two-thirds of the light is being absorbed by the photo-resists and wasted, leading to low optical transmittance and resulting in low brightness. Additionally, the material cost for the fabrication of the photo-resists of the three colors such as Red (R), Green (G) and Blue (B) is rather substantial. Wherein the thickness of the photo-resists of three colors such as Red (R), Green (G) and Blue (B) is the same each other (is identical each other).

Accordingly, as demand for high luminous brightness of a liquid crystal display becomes increasingly important, solving the above-mentioned problems is an imminent issue in the production technology of display panels.

SUMMARY OF THE INVENTION

In view of the foregoing, the present invention provides a display panel that has a better image quality.

The present invention also provides a method of fabricating a display panel, wherein by controlling the thickness of the display medium in the sub-pixel, the display panel provides a better image quality.

The present invention also provides an electro-optical apparatus that has a better image quality.

The present invention further provides a method of fabricating an electro-optical apparatus for fabricating the above-mentioned electro-optical apparatus.

The present invention provides a display panel that includes a pair of substrates, a color filter layer and a display medium. The display panel includes a plurality of pixels, and each pixel at least includes a first sub-pixel, a second sub-pixel, a third sub-pixel and a fourth sub-pixel. The color filter layer is disposed over one of the pair of substrates, wherein the color filter layer at least includes a first color filter pattern positioned at the first sub-pixel, a second color filter pattern positioned at the second sub-pixel, a third color filter pattern positioned at the third sub-pixel, a fourth color filter pattern positioned at the fourth sub-pixel. The display medium is configured in between the substrates, wherein the display medium configured at the first sub-pixel has a first thickness ($T1$), the display medium configured at the second sub-pixel has a second thickness ($T2$), the display medium configured at the third sub-pixel has a third thickness ($T3$), the display medium configured at the fourth sub-pixel has a fourth thickness ($T4$). Further, $T1>T2>T3$, and $T1>T4>T3$.

The present invention provides a method of fabricating a display panel, and the method includes at least the following steps. A pair of substrates is provided, wherein the pair of substrates includes a plurality of pixels, and each pixel at least includes a first sub-pixel, a second sub-pixel, a third sub-pixel, and a fourth sub-pixel. Then, a color filter layer is configured above one of the pair of the substrates, wherein the color filter layer at least includes a first sub-pixel, a second sub-pixel, a third sub-pixel, and a fourth sub-pixel. Thereafter, a display medium is disposed between the pair of substrates, wherein the display medium configured at the first sub-pixel has a first thickness ($T1$), the display medium configured at the second sub-pixel has a second thickness ($T2$), the display medium configured at the third sub-pixel has a third thickness ($T3$), the display medium configured at the fourth sub-pixel has a fourth thickness ($T4$). Further, $T1>T2>T3$, and $T1>T4>T3$.

The present invention further provides an electro-optical apparatus that comprises the display panel described in the above embodiment.

Accordingly, the present invention improves the brightness in a conventional design and resolves the problem of contrast ratio by adding one sub-pixel and appropriately adjusting the thickness of the display medium that correspond to each sub-pixel. Not only light-emitting efficiency is enhanced, lower power consumption lower cost and better image quality are resulted.

It is to be understood that both the foregoing general description and the following detailed description are exemplary, and are intended to provide further explanation of the present invention as claimed.

BRIEF DESCRIPTION OF THE DRAWINGS

The accompanying drawings are included to provide a further understanding of the present invention, and are incor

DESCRIPTION OF THE PREFERRED EMBODIMENTS

Figure 1:
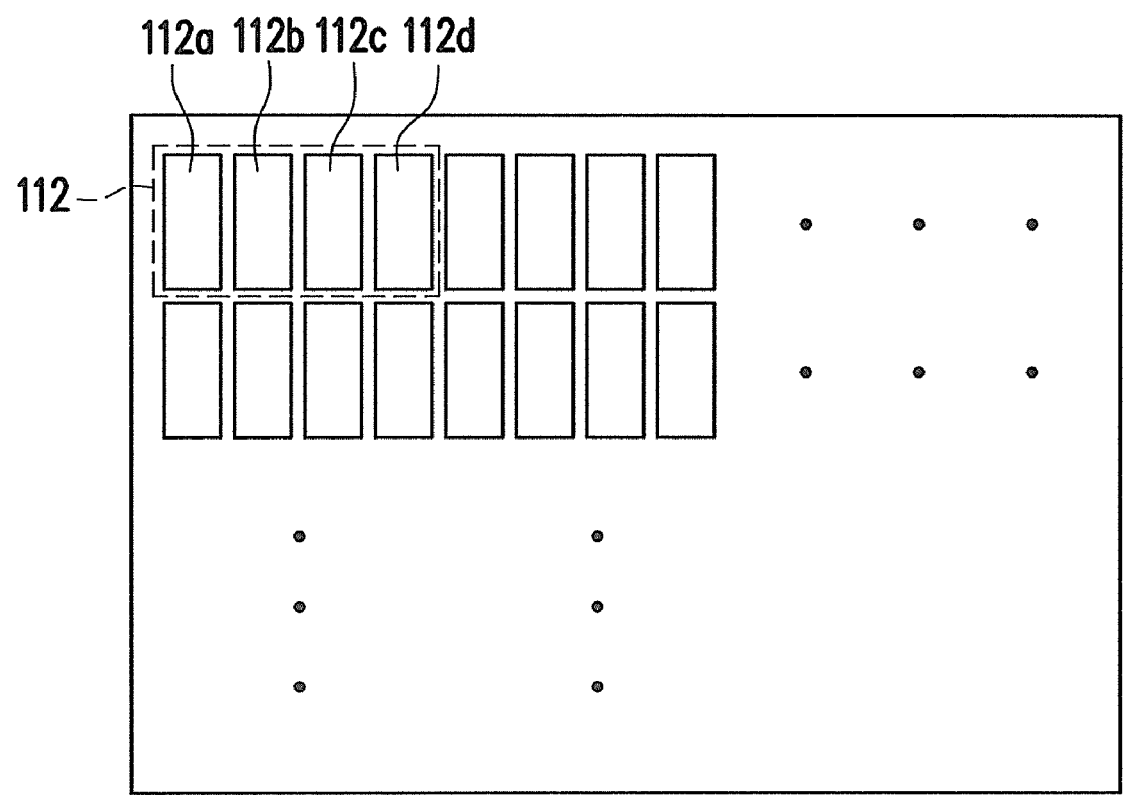
- FIG. 1 is a top view of a display panel according to an embodiment of the present invention.

FIG. 1 is a top view of a display panel according to an embodiment of the present invention. Referring to FIG. 1, a portion of the pixels 112 is illustrated, and each pixel 112 at least includes one first sub-pixel 112*a*, one second sub-pixel 112*b*, one third sub-pixel 112*c*, and one fourth sub-pixel 112*d*. It should be appreciated that each pixel of the present invention is not limited to include the above numbers of sub-pixels. For example, in other embodiments of the present invention, each pixel 112 may includes 5, 6, 7, or 8 sub-pixels. Moreover, in FIG. 1 of this embodiment of the present invention, the above-described sub-pixels 112*a*, 112*b*, 112*c*, 112*d* are individually disposed. It should be appreciated that the present invention is not limited as such. In other embodiments of the present invention that are not graphically illustrated herein, at least one fourth sub-pixel 112*d* may configure in between the first sub-pixel 112*a*, the second sub-pixel 112*b* and the third sub-pixel 112*c* when viewing from the top, or least one fourth sub-pixel 112*d* is disposed in either one of the first sub-pixel 112*a*, the second sub-pixel 112*b*, and the third sub-pixel 112*c*.

In an embodiment of the present invention, the colors displayed by the first sub-pixel 112*a*, the second sub-pixel 112*b*, the third sub-pixel 112*c*, the fourth sub-pixel 112*d* are respectively red, blue, green and white, for example. However, it is understood that the present invention is not limited as such. In other embodiments, other colors of the chromatic coordinates can also be applied, for example, yellow, purple, brown, cyan, fuchsia, orange, or other appropriate colors. If each pixel 112 includes at least four sub-pixels. Wherein the mixture color of the first sub-pixel 112*a*, the second sub-pixel 112*b*, and the third sub-pixel 112*c* is shown to be white (transparent) in one exemplary embodiment is second choice. In another exemplary embodiment, preferred (first choice), the mixture color of the first sub-pixel 112*a*, the second sub-pixel 112*b*, the third sub-pixel 112*c*, and the fourth sub-pixel 112*d* is shown to be white (transparent). In other words, the mixture color of the at least four sub-pixels (112*a*, 112*b*, 112*c*, 112*d*) is more tend to the white (transparent) than the mixture color of the three sub-pixels (112*a*, 112*b*, 112*c*).

Moreover, the display medium (not shown in FIG. 1) is disposed between the two substrates and correspondingly disposed in each sub-pixel. The material of the display medium includes, for example, a liquid crystal material, a self-luminescent material, an electrophoretic material, other appropriate materials, or a combination thereof. In this embodiment of the present invention, the display medium is, for example, a liquid crystal material or an electrophoretic material. It should be appreciated the display medium of the present invention is not limited to these materials. Further, the display medium configured at the first sub-pixel has a first thickness T1 (not shown in FIG. 1), the display medium configured at the second sub-pixel has a first thickness T2 (not shown in FIG. 1), the display medium configured at the third sub-pixel has a third thickness T3 (not shown in FIG. 1), and the display medium configured at the fourth sub-pixel has a fourth thickness T4 (not shown in FIG. 1), wherein T1>T2>T3 and T1>T4>T3. More specifically, the thicknesses of T2 and T4 are not particularly limited. In other words, the relationship of the thicknesses of the display medium configured at the different sub-pixels could be T1>T2>T4>T3, T1>T4>T2>T3 or T1>T4=T2>T3. In one exemplary embodiment (preferred embodiment or first choice embodiment) of the present invention, a relationship of the thicknesses of the display medium is T1>T4=T2>T3. According to the present invention, the thickness of the display medium in each sub-pixel varies. Reference will now be made in detail to the present invention and the various embodiments thereof.

First Embodiment

Figure 2:
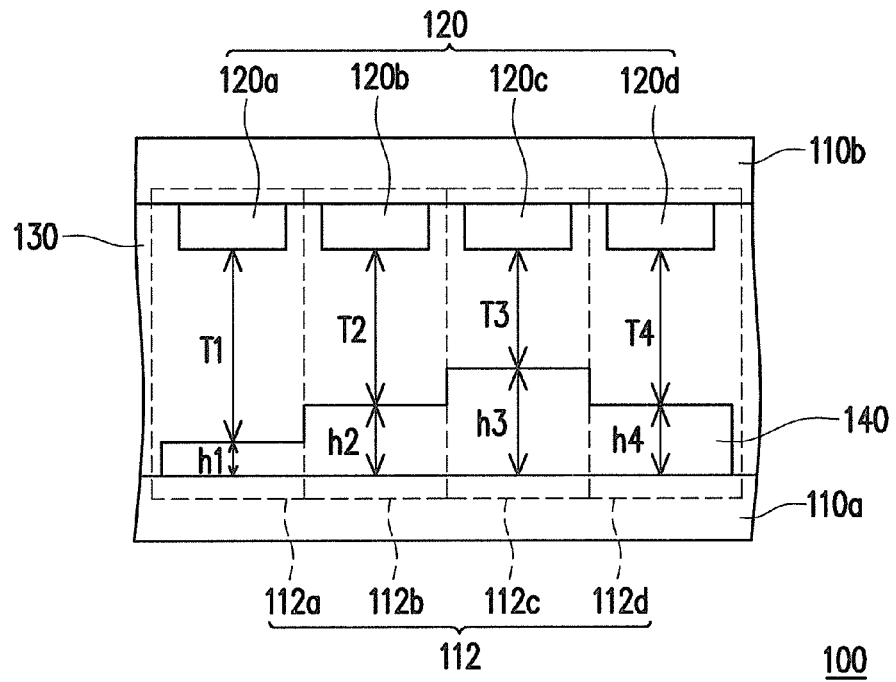
FIG. 2 is a schematic cross-sectional view of a display panel according to one embodiment of the present invention.

FIG. 2 is a schematic cross-sectional view of a display panel according to one embodiment of the present invention. Referring to FIGS. 1 and 2, the display panel 100 includes a pair of substrates 110*a*, 110*b*, a color filter layer 120 and a display medium 130. The pair of substrates 110*a*, 110*b* includes a plurality of pixels 112, and each pixel 112 at least includes one first sub-pixel 112*a*, one second sub-pixel 112*b*, one third sub-pixel 112*c*, and one fourth sub-pixel 112*d*.

In one embodiment of the present invention, the substrate 110a includes an overcoat layer 140 thereover, wherein the heights (thickness) of the overcoat layer 140 at the first sub-pixel 112a, the second sub-pixel 112b, the third sub-pixel 112c, and the fourth sub-pixel 112d are respectively h1, h2, h3 and h4, wherein h1<h2<h3, and h1<h4<h3. For example, the overcoat layer 140 may be an active device array layer, a planarizing layer, an electrode layer, an alignment layer, or a combination thereof.

Moreover, in this embodiment of the present invention, the material of one of the substrates 110a, 110b includes an inorganic transparent material (such as glass, quartz, other suitable materials or a combination thereof), an organic transparent material (such as polyalkenes, polythiols, polyalcohols, polyesters, rubber, thermoplastic polymers, thermosetting polymers, polyarylenes, polymethyl methacrylates, polycarbonates, other suitable materials, derivatives or combinations thereof), an inorganic opaque material (such as silica sheet, ceramic, other suitable materials, or a combination thereof), or a combination thereof.

The color filter layer 120 is disposed on the substrate 110b, wherein the color filter layer 120 at least includes one first color filter pattern 120a positioned at the first sub-pixel 112a, one second color filter pattern 120a positioned at the second sub-pixel 112a, one third color filter pattern 120a positioned at the third sub-pixel 112a, one fourth color filter pattern 120a positioned at the fourth sub-pixel 112a. In one embodiment of the present invention, the first color filter pattern 120a is, for example, a red color filter pattern (R), the second color filter pattern 120b is, for example, a green color filter pattern (G), the third color filter pattern 120c is, for example, a blue color filter pattern (B), and the fourth color filter pattern 120d is, for example, a white (transparent) color filter pattern (W). In other embodiments of the present invention, asides from using the above colors, the first, second, third, and fourth color filter patterns 120a, 120b, 120c, 120d also use other colors on the chromatic coordinates, for example, yellow, purple, brown, cyan, fuchsia, orange, or other appropriate colors. In one exemplary embodiment, the mixture color of the first, second and third color filter patterns 120a, 120b, 120c is shown to be white (transparent) is second choice. In another exemplary embodiment, preferred (first choice), the mixture color of the first, second, third and fourth color filter patterns 120a, 120b, 120c, 120d is shown to be white (transparent). In other words, if the pixel 112 includes at least four sub-pixels, it is secondary preferred to have the mixed color shown by the first sub-pixel 112a, the second sub-pixel 112b, the third sub-pixel 112c be white (transparent). More preferably, the mixed color shown by the first sub-pixel 112a, the second sub-pixel 112b, the third sub-pixel 112c and the fourth sub-pixel 112d is white (transparent). In this embodiment of the present invention, the first color filter pattern 120a, the second color filter pattern 120b, the third color filter pattern 120c and the fourth color filter pattern have substantially the same thickness.

In this embodiment of the present invention, the color filter layer 120 is formed by spin coating and baking, for example, forming sequentially in different sub-pixel regions a patterned first color pattern 120a, for example, red color filter pattern (R), a patterned second color pattern 120b, for example, green color filter pattern (G), a patterned third color pattern 120c, for example, blue color filter pattern (B), a patterned fourth color pattern 120d, for example, white color filter pattern (W). Then, a plurality of light-shielding pattern layers (not shown) is formed between the sub-pixels. Alternatively, a plurality of light-shielding pattern layers is formed prior to the formation of a first color pattern 120a, for example, red color filter pattern (R), a second color pattern 120b, for example, red color filter pattern (G), a third color pattern 120c, for example, blue color filter pattern (B), a fourth color pattern 120d, for example, white color filter pattern (W), wherein each light-shielding pattern layer is located between each pixel. The fabrication of the color filter layer 120 is not limited to a particular method. In other exemplary embodiments, ink-jet printing or other suitable methods may be applied in the fabrication of the color filter layer 120.

The display medium 130 is disposed between the substrates 110a and 110b. The display medium 130 is formed with, for example, a liquid crystal material. More particularly, the display medium 130 includes a first thickness T1 positioned at the first sub-pixel 112a, a second thickness T2 positioned at the second sub-pixel 112b, a third thickness T3 positioned at the third sub-pixel 112c, a fourth thickness T4 positioned at the fourth sub-pixel 112d, wherein T1>T2>T3 and T1>T4>T3. More specifically, the degree of thickness of T2 and T4 are not particularly limited. In other words, the relationship of the thicknesses of the display medium configured at the different pixels could be T1>T2>T4>T3, T1>T4>T2>T3, or T1>T4=T2>T3. In one embodiment (preferred embodiment or first choice embodiment) of the present invention, a relationship of the thicknesses is T1>T4=T2>T3. It is worthy to note that, in this embodiment of the present invention, the heights (thickness) of the overcoat layer 140 configured over the substrate 110a contribute to the various thicknesses T1, T2, T3, T4 of the display medium 130 at the different sub-pixels.

Second Embodiment

Figure 3:
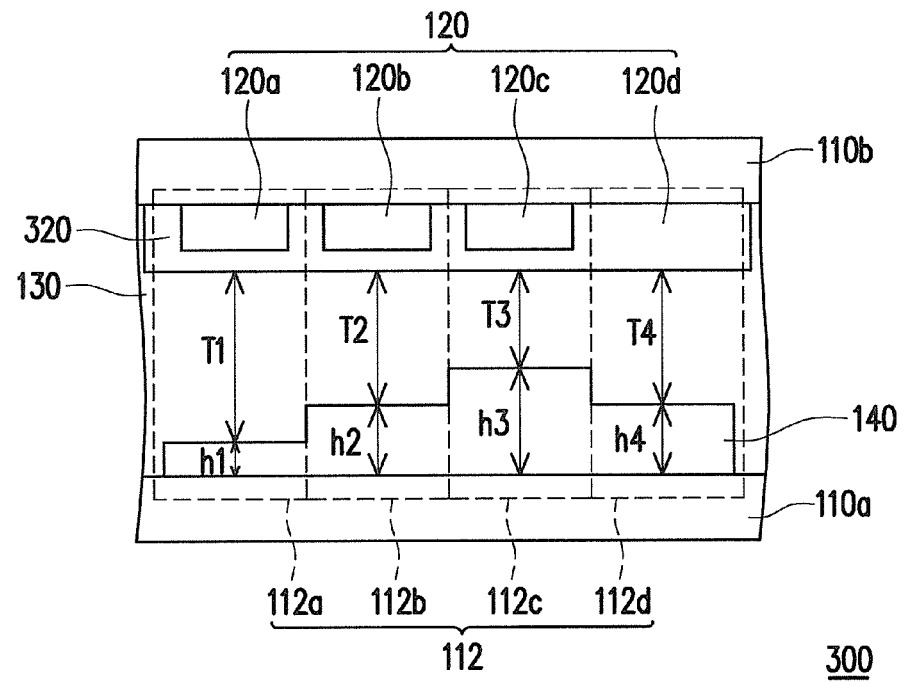
FIG. 3 is a schematic cross-sectional view of a display panel according to one embodiment of the present invention.

FIG. 3 is a schematic cross-sectional view diagram of a display panel according to one embodiment of the present invention. As shown in FIG. 3, the display panel 300 is similar to the display panel 100 in the First Embodiment, the detail description thereof could be referred to FIG. 1 and FIG. 2 of the First Embodiment, and will not be further reiterated herein. The difference between this embodiment and the previous embodiment of the present invention is that this embodiment further provides forming an overcoat layer 320 on the color filter layer 120 above the substrate 110b to cover the color filter layer 120. It is also worthy to note that, in this embodiment, the overcoat layer 320 disposed at the fourth sub-pixel 112d may concurrently serve as the color filter pattern of the fourth sub-pixel 112d to save the time and the cost in the fabrication of the fourth sub-pixel 1123, for example, a transparent (white) filter pattern.

More specifically, the overcoat layer 320 may be a passivation layer or a combination of a passivation layer and an electrode layer, wherein the passivation layer can be a single layer or a multilayer material. The material of the passivation layer preferred includes polymer material, for example, acrylic resin, novolac resin, or other suited materials. The electrode layer may be a single layer or a multilayer material, and the material of the electrode layer includes, but not limited to, indium titanium oxide, indium zinc oxide, indium-tin-zinc oxide, hafnium oxide, indium oxide, titanium oxide, zinc oxide, aluminum oxide, aluminum-tin oxide, aluminum-zinc oxide, cadmium-tin oxide, cadmium-zinc oxide, other suited materials, or combinations thereof. In this embodiment of the present invention, the thickness of the overcoat layer 320 corresponding to the first color filter pattern 120a, the second color filter pattern 120b, the third color filter pattern 120c and the fourth color filter pattern 120d is substantially the same. Alternatively speaking, the overcoat layer 320 configured at the first, second, third, and fourth sub-pixels 112a, 112b, 112c and 112d appears to be planarized.

It is worth noting that, in this embodiment of the present invention, the heights (thickness) of the overcoat layer 140 over the substrate 110a contribute to the various thicknesses T1, T2, T3, T4 of the display medium 130 at the different sub-pixels.

Third Embodiment

Figure 4:
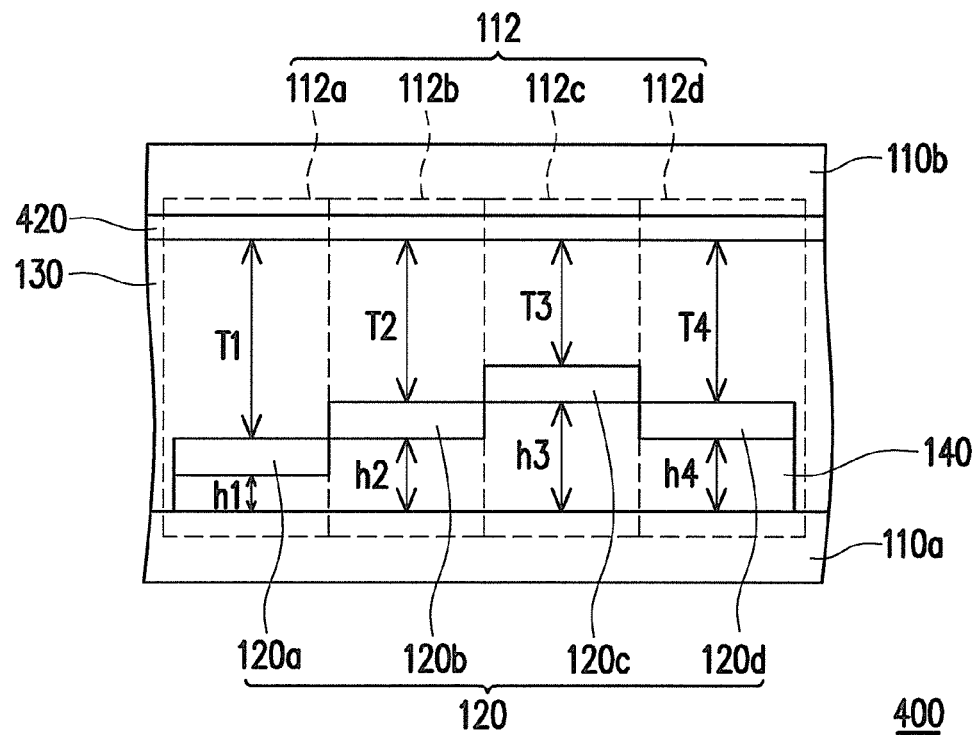
FIG. 4 is a schematic cross-sectional view of a display panel according to one embodiment of the present invention.

FIG. 4 is a schematic, cross-section view diagram of a display panel according to an embodiment of the present invention. As shown in FIG. 4, the display panel 400 is similar to the display panel 100 in the First Embodiment, the detail description of the display panel 400 could be referred to FIG. 1 and FIG. 2 of the First Embodiment, and will not be further reiterated herein. The difference between this embodiment and the First embodiment of the present invention is that this embodiment further provides the color filter layer 120 being disposed on the overcoat layer 140 over the substrate 110a. Alternatively speaking, the substrate 110a is an integrated Color Filter on Array substrate (COA substrate). In other possible embodiments, the previously-mentioned color filter layer 120 may disposed on the substrate 110a under the overcoat layer 140. In other words, the substrate 110a is one integrated Array on Color Filter substrate (AOC substrate), wherein the film layer of the overcoat layer 140 is an active device array layer, planarization layer, an electrode layer, an alignment layer, or a combination thereof, or other suitable layers.

It is worth noting that, in this embodiment of the present invention, the height (thickness) of the overcoat layer 140 configured over the substrate 110a contributes to the various thicknesses T1, T2, T3, T4 of the display medium 130 at the different sub-pixels.

Fourth Embodiment

Figure 5:
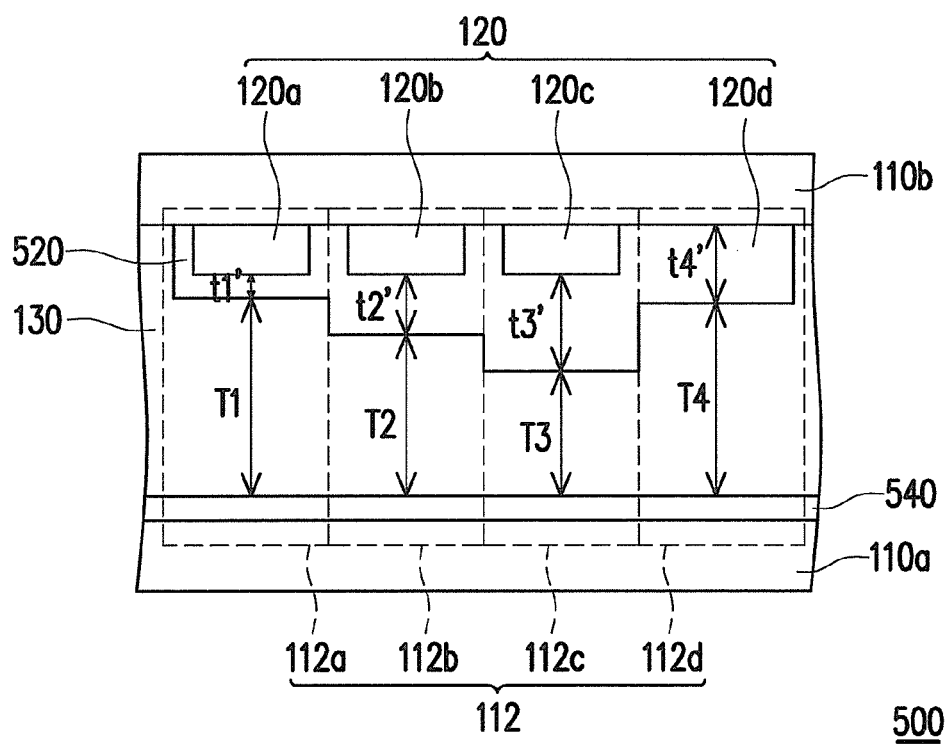
FIG. 5 is a schematic cross-sectional view of a display panel according to one embodiment of the present invention.

FIG. 5 is a schematic, cross-section view diagram of a display panel according to an embodiment of the present invention. As shown in FIG. 5, the display panel 400 is similar to the display panel 100 in the First Embodiment, the detail description of the display panel 400 could be referred to FIG. 1 and FIG. 2 of the First Embodiment and will not be further reiterated herein. The difference between this embodiment and the previous embodiment of the present invention is described as follows. In this embodiment of the present invention, the substrate 110a includes an overcoat layer 540, wherein the thickness of the overcoat layer 540 corresponding to the locations of the first sub-pixel 112a, the second sub-pixel 112b, the third sub-pixel 112c, and the fourth sub-pixel 112d is substantially the same. Further, the thicknesses of the first color filter pattern 120a, the second color filter pattern 120b, the third color filter pattern 120c, and the fourth color filter pattern 120d are substantially the same. Additionally, in this embodiment of the present invention, an overcoat layer 520 is also formed on the color filter layer 120 disposed over the above-mentioned substrate 110b to cover the color filter layer 120. The thickness of the overcoat layer 520 at the first sub-pixel 112a, the second sub-pixel 112b, the third sub-pixel 112c, and the fourth sub-pixel 112d are respectively t1', t2', t3' and t4', wherein t1'<t2'<t3' and t1'<t4'<t3'. Wherein this embodiment, the thickness of the fourth sub-pixel 112d is may be substantially less than or greater than the thickness of the second sub-pixel 112b, but the preferred, the thickness of the fourth sub-pixel 112d is substantially identical to the thickness of the second sub-pixel 112b. It is worthy to note that, in this embodiment of the present invention, the overcoat layer 520 disposed at the fourth sub-pixel 112d also serves as the color filter pattern of the fourth sub-pixel 112d to reduce the time and the cost in the fabrication of the fourth color filter pattern, for example, a transparent (white) filter pattern.

It is worthy to note that, in this embodiment, the height (thickness) of the overcoat layer 520 configured over the substrate 110a contributes to the various thicknesses T1, T2, T3, T4 of the display medium 130 at the different sub-pixels.

Fifth Embodiment

Figure 6:
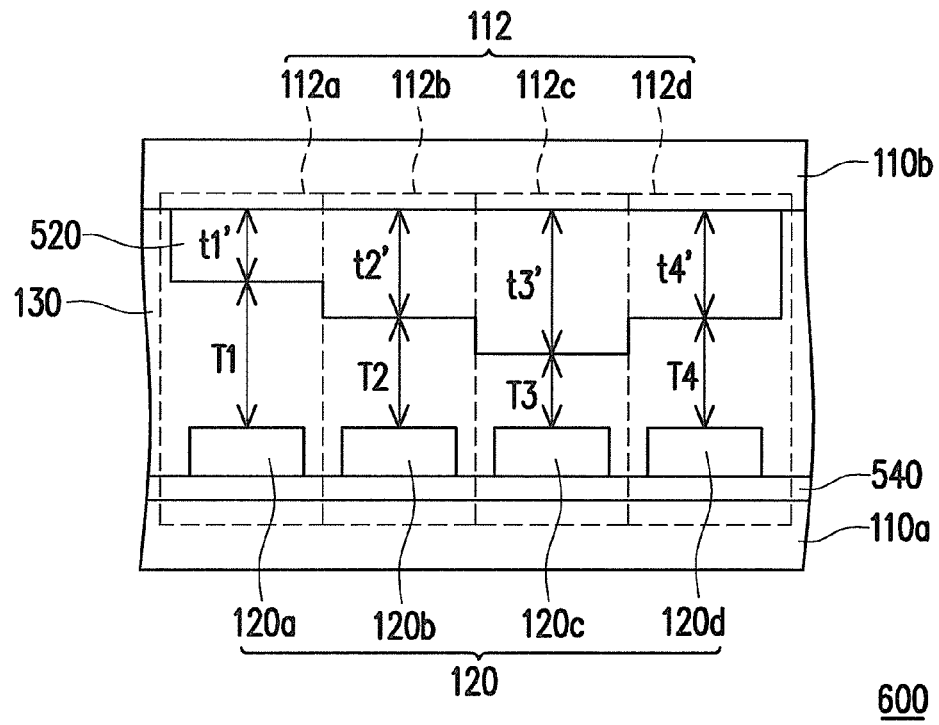
FIG. 6 is a schematic cross-sectional view of a display panel according to one embodiment of the present invention.

FIG. 6 is a schematic, cross-section view diagram of a display panel according to an embodiment of the present invention. As shown in FIG. 6, the display panel 600 is similar to the display panel 500 in the Fourth Embodiment, the detail description of the display panel 400 could be referred to the Fourth Embodiment, FIG. 1 and FIG. 2 of Embodiment 1, and will not be further reiterated herein. The difference between this embodiment and the Fourth Embodiment of the present invention is that the color filter layer 120 is disposed on the overcoat layer 540 over the substrate 110a. Alternatively speaking, the substrate 110a is an integrated Color Filter on Array substrate (COA substrate). In other possible embodiments, the previously-mentioned color filter layer 120 may disposed on the substrate 110a under the overcoat layer 540. In other words, the substrate 110a is one integrated Array on Color Filter substrate (AOC substrate).

It is worthy to note that, in this embodiment, the heights (thickness) of the overcoat layer 520 configured over the substrate 110a contribute to the various thicknesses T1, T2, T3, T4 of the display medium 130 at the different sub-pixels.

Sixth Embodiment

Figure 7:
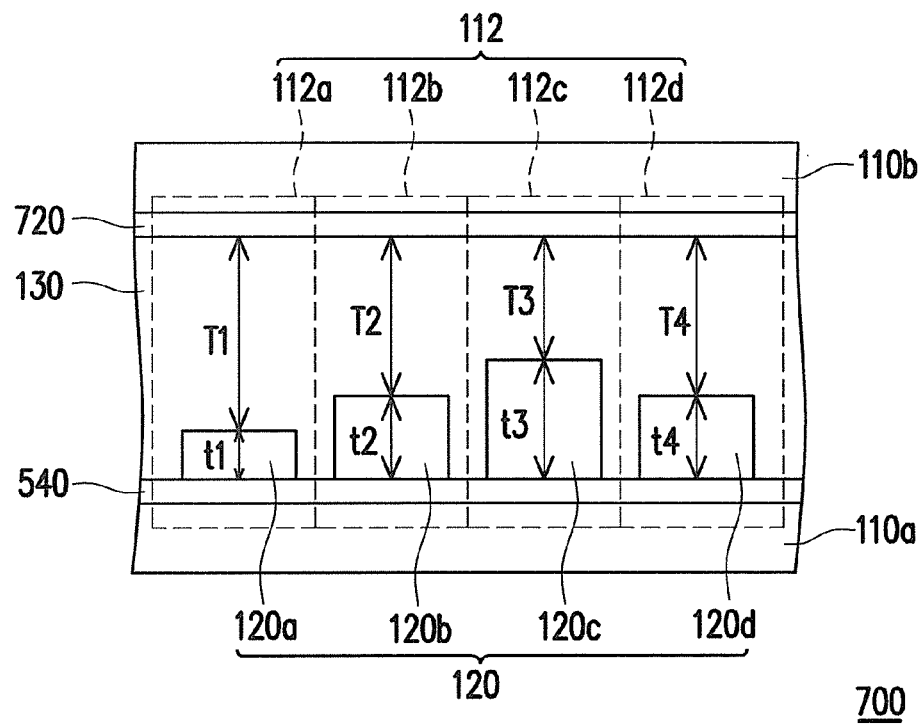
FIG. 7 is a schematic cross-sectional view of a display panel according to one embodiment of the present invention.

FIG. 7 is a schematic, cross-section view diagram of a display panel according to an embodiment of the present invention. As shown in FIG. 7, the display panel 700 is similar to the display panel 100 in the Fifth Embodiment, the detail description of the display panel 700 could be referred to the Fifth Embodiment, FIG. 1 and FIG. 2 of Embodiment 1, and will not be further reiterated herein. The difference between this embodiment and the Fifth Embodiment of the present invention is that an overcoat layer 540 is provided over the substrate 110a, wherein the thickness of the overcoat layer 540 corresponding to the locations of the first sub-pixel 112a, the second sub-pixel 112b, the third sub-pixel 112c and the fourth sub-pixel 112d is substantially the same. In this embodiment, the substrate 110b also includes another overcoat layer 720 thereover, wherein the thickness of the overcoat layer 720 corresponding to the first color filter pattern 120a, the second color filter pattern 120b, the third color filter pattern 120c and the fourth color filter pattern 120d is substantially the same. Further, the color filter layer 120 is disposed over the substrate 110a. In this embodiment, the color filter layer 120 is disposed above the overcoat layer 540 over the substrate 110a, wherein the thicknesses of the first color filter pattern 120a, the second color filter pattern 120b, the third color filter pattern 120c and the fourth color filter pattern 120d are respectively t1, t2 t3 and t4, and t1<t2<t3 and t1<t4<t3. In other words, as color filter layer 120 is being disposed above the overcoat layer 540 over the substrate 110a, the substrate 110a is an integrated Color Filter on Array substrate (COA substrate). In other possible embodiments, the previously-mentioned color filter layer 120 may disposed on the substrate 110a under the overcoat layer 540. When the color filter layer 120 is being disposed over the substrate 10a under the overcoat layer 540, the substrate 110a is an integrated Array on Color Filter substrate (AOC substrate).

It is worth noting that, in this embodiment of the present invention, the different thicknesses of the first color filter pattern 120a, the second color filter pattern 120b, the third color filter pattern 120c, and the fourth color filter pattern 120d over the substrate 110a contributes to the various thicknesses T1, T2, T3, T4 of the display medium 130 at the different sub-pixels.

Seventh Embodiment

Figure 8:
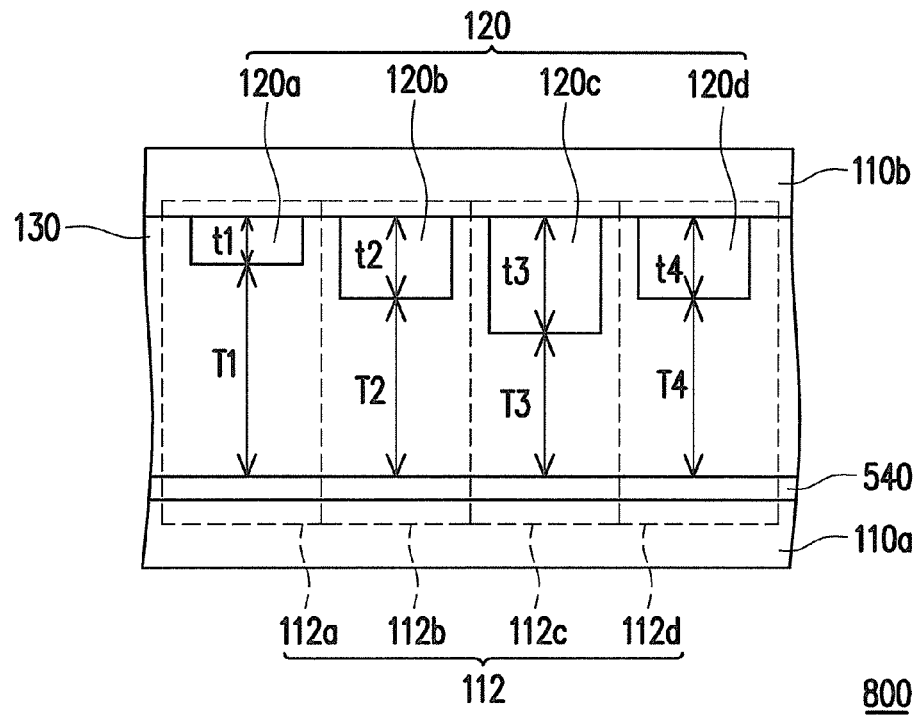
FIG. 8 is a schematic cross-sectional view of a display panel according to one embodiment of the present invention.

FIG. 8 is a schematic, cross-section view diagram of a display panel according to an embodiment of the present invention. As shown in FIG. 8, the display panel 800 is similar to the display panel 700 in the Sixth Embodiment, and the detail description of the display panel 400 could be referred to the Sixth Embodiment, FIG. 1 and FIG. 2 of the First Embodiment, and will not be further reiterated herein. The difference between this embodiment and the previous embodiment of the present invention is that the thicknesses of the first color filter pattern 120a the second color filter pattern 120b, the third color filter pattern 120c, and the fourth color filter pattern 120d are respectively t1, t2 t3 and t4, and t1<t2<t3 and t1<t4<t3.

It is worthy to note that, in this embodiment of the present invention, the various thicknesses t1, t2 t3 and t4 of the first color filter pattern 120a the second color filter pattern 120b, the third color filter pattern 120c and the fourth color filter pattern 120d of the color filter layer 120 disposed over the substrate 110b contribute to the different thicknesses T1, T2, T3, T4 of the display medium 130 at the different sub-pixels. Accordingly, the relationship between the first thickness T1 of the display medium 130 at the first sub-pixel 112a, the second thickness T2 of the display medium 130 at the second sub-pixel 112b, a third thickness T3 the display medium 130 at the third sub-pixel 112c, a fourth thickness T4 of the display medium 130 at the fourth sub-pixel 112d is T1>T2>T3 and T1>T4>T3, for example.

Eighth Embodiment

Figure 9:
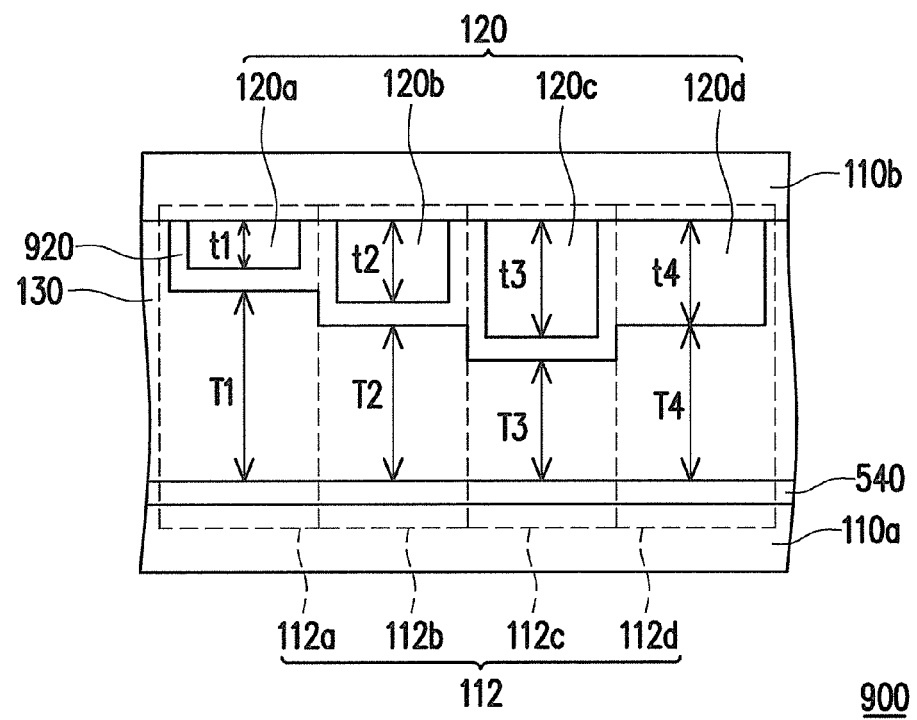
FIG. 9 is a schematic cross-sectional view of a display panel according to one embodiment of the present invention.

FIG. 9 is a schematic cross-sectional view diagram of a display panel according to one embodiment of the present invention. As shown in FIG. 9, the display panel 900 is similar to the display panel 800 in the Seventh Embodiment, the detail description thereof could be referred to the Seventh Embodiment, FIG. 1 and FIG. 2 of the First Embodiment, and will not be further reiterated herein. The difference between this embodiment and the previous embodiment of the present invention is that an overcoat layer 920 is further provided above the color filter layer 120 over the substrate 110b, and the overcoat layer 920 covers the surfaces of the first color filter pattern 120a, the second color filter pattern 120b, the third color filter pattern 120c, and the fourth color filter pattern 120d. It is also worthy to note that, in this embodiment, the overcoat layer 920 is disposed at the fourth sub-pixel 112d; alternatively, the overcoat layer 920 may concurrently serve as the color filter pattern of the fourth sub-pixel 112d to save the time and the cost in the fabrication of a transparent (white) filter pattern.

More specifically, the overcoat layer 920 may be a passivation layer or a combination of a passivation layer and an electrode layer, wherein the passivation layer can be a single layer or a multilayer material. The material of the passivation layer preferred includes polymer material, for example, acrylic resin, novolac resin, or other suited materials. The electrode layer may be a single layer or a multilayer material, and the material of the electrode layer includes, but not limited to, indium titanium oxide, indium zinc oxide, indium-tin-zinc oxide, hafnium oxide, indium oxide, titanium oxide, zinc oxide, aluminum oxide, aluminum-tin oxide, aluminum-zinc oxide, cadmium-tin oxide, cadmium-zinc oxide, or combinations thereof.

It is worthy to note that, in this embodiment of the present invention, the various thicknesses t1, t2, t3 and t4 of the first color filter pattern 120a the second color filter pattern 120b, the third color filter pattern 120c and the fourth color filter pattern 120d of the color filter layer 120 disposed over the substrate 110b contribute to the different thicknesses T1, T2, T3, T4 of the display medium 130 at the different sub-pixels. Accordingly, the relationship between the first thickness T1 of the display medium 130 at the first sub-pixel 112a, the second thickness T2 of the display medium 130 at the second sub-pixel 112b, a third thickness T3 the display medium 130 at the third sub-pixel 112c, a fourth thickness T4 of the display medium 130 at the fourth sub-pixel 112d is T1>T2>T3 and T1>T4>T3, for example.

Compare with the conventional three-primary color (RGB) display device, the at least four color display device, for example, (RGBW), due to the introduction of the fourth pixel, for example, the W pixel, the transmittance of the back light source with respect to the display panel is enhanced; hence, the brightness is improved and the power consumption and the cost are reduced. When the thickness of the first to fourth sub-pixels is identical each other, the brightness of the fourth sub-pixel (such as white sub-pixel) is greater than the first, second, third of the sub-pixels (such as R, G, and B sub-pixel) easy to causing a serious color-shift in image display and reduce the image quality. The above-mentioned embodiments to control the thickness of the display media layer can be reduce the color shift and improve the image quality, please see the below description.

A display apparatus is provided images with suitable gray scale according to the ambient brightness. Further, the brightness actually perceived by the human eyes is not linear to the change of ambient light intensity. Thus, in order to improve the deviation of the gray scale caused by the ambient brightness of the environment, the hardware is typically designed with an external resistor to generate a voltage-transmittance curve (V-T curve) for describing the transmittance characteristic of the liquid crystal panel under different voltages. A gamma curve follows the functional relation, $T=(i/g)^\gamma$, in which T is the transmittance, g is the total gray scale value (total gray level), i is a particular gray scale in the total gray scale value g, and $\gamma$ is the gamma constant. The at least four color display device of an embodiment of the present invention is, for example a RGBW display with the mixture color being white (transparent); but it should be appreciated that the present invention is not limited as such. As the gamma curve of the at least four color display device normally white are being adjusted, the optimum condition is to have the voltage-transmittance curves of the at least four color sub-pixels, for example, the four sub-pixels RGBW, overlap such that as the gamma curve of the normally white is adjusted to $\gamma=2.2$. The gamma curves of the at least four color pixel are also being $\gamma=2.2$ to achieve a desired picture quality.

During the fabrication of the panel, the thickness of the display medium of the least four sub-pixels, for example, the four sub-pixels RGBW, has not been properly designed, leading to the voltage-transmittance curves of the least four sub-pixels, for example, the four sub-pixels RGBW, not being overlapped, and if the gamma curve of the normally white is adjusted to $\gamma=2.2$, the gamma curves of the at least four sub-pixels, for example, the four sub-pixels RGBW, are not all being γ=2.2. Further, since the brightness of the fourth sub-pixel, for example, W sub-pixel, is much higher than the brightness of the first to the third pixels, for example, the gamma curves of the RGB three sub-pixels are further away from γ=2.2, resulting in the at least four sub-pixels, for example, the four sub-pixels RGBW, display device having poor image quality, for example, the color tracking of pure white is more serious than the tri-color display device.

Figure 10:
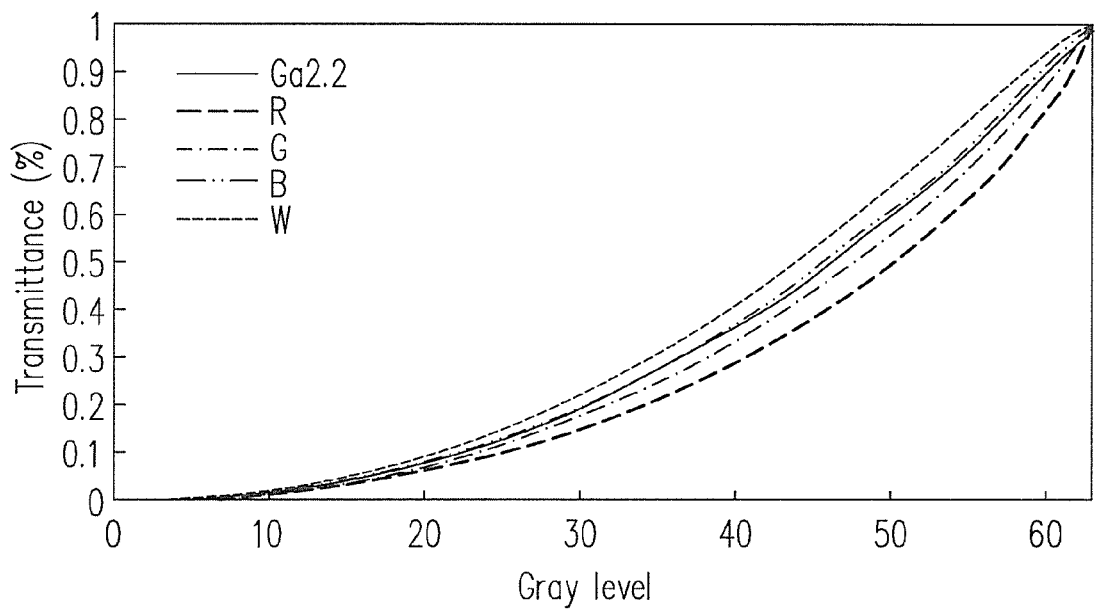
FIG. 10 is a diagram of gamma curves of a display device in which the thickness of the display medium has not been properly adjusted according to the sub-pixels.

FIG. 10 is a diagram of gamma curves of a display device in which the thickness of the display medium has not been properly adjusted with respect to the sub-pixels. Referring to FIG. 10, when the thickness of the display medium of the four sub-pixels has not been properly adjusted, for example, the thickness of the display medium of the red color sub-pixel is TR=3.6 μm, the thickness of the display medium of the blue color sub-pixel is TG=3.6 μm, the thickness of the display medium of the blue color sub-pixel is TB=3.6 μm, the thickness of the display medium of the transparent (white) color sub-pixel is TW=4.2 μm. The X-axis represents gray level, while the Y-axis represents light transmittance. When the gamma curve of the normally white is adjusted to γ=2.2, the gamma curve of the sub-pixel of each color is not equal to 2.2 (γ≠2.2), and the gamma curves of the at least four color sub-pixels, for example, RGBW, apparently separate from each other.

Figure 11:
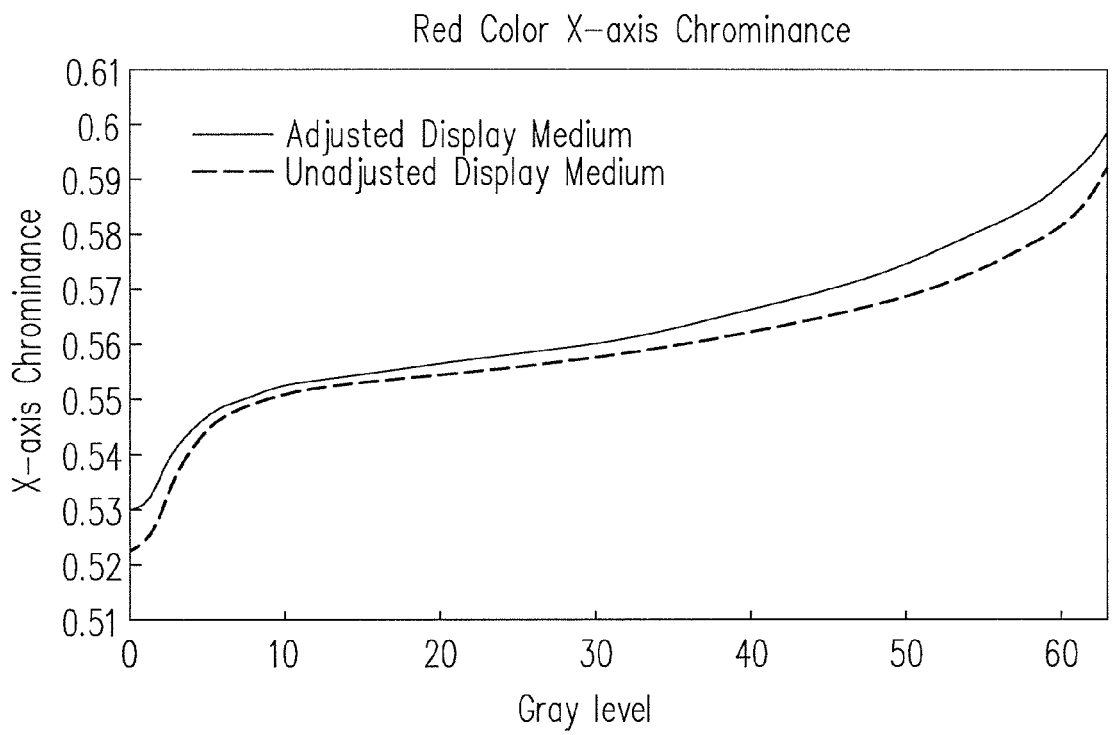
FIGS. 11 and 12 respectively illustrate the relationship between chromatic coordinates and gray level of the red sub-pixel at the X-axis and the Y-axis chrominance in FIG. 10.
Figure 12:
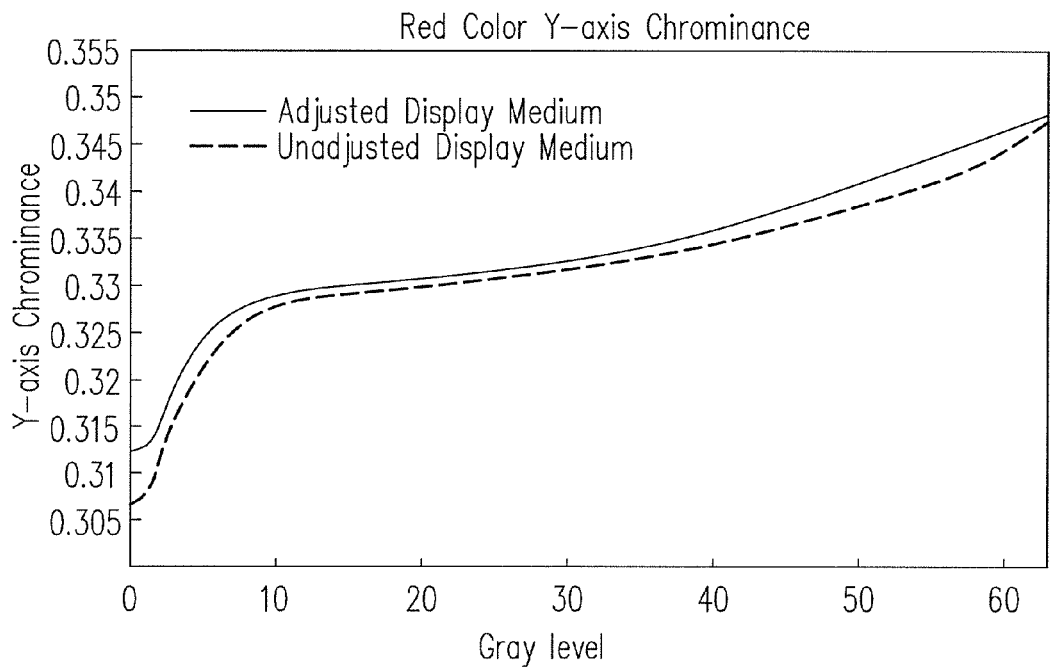

FIGS. 11 and 12 respectively illustrate the relationship between chromatic coordinates and gray level of the red sub-pixel at the X-axis and the Y-axis chrominance in FIG. 10. Referring concurrently to both FIGS. 11 and 12, as previously discussed, since the brightness of the transparent (white) sub-pixel W is higher than the brightness of the three-primary color sub-pixels RGB, the transparent (white) sub-pixel W is dominant in the total sum of the overall brightness when the thickness of the display medium of the sub-pixel has not been adjusted. Hence, the gamma curve of the red sub-pixel, in which the original brightness is already darker, is further away from γ=2.2, resulting in the color tracking of the red color further deviates from the desired curve.

Figure 13:
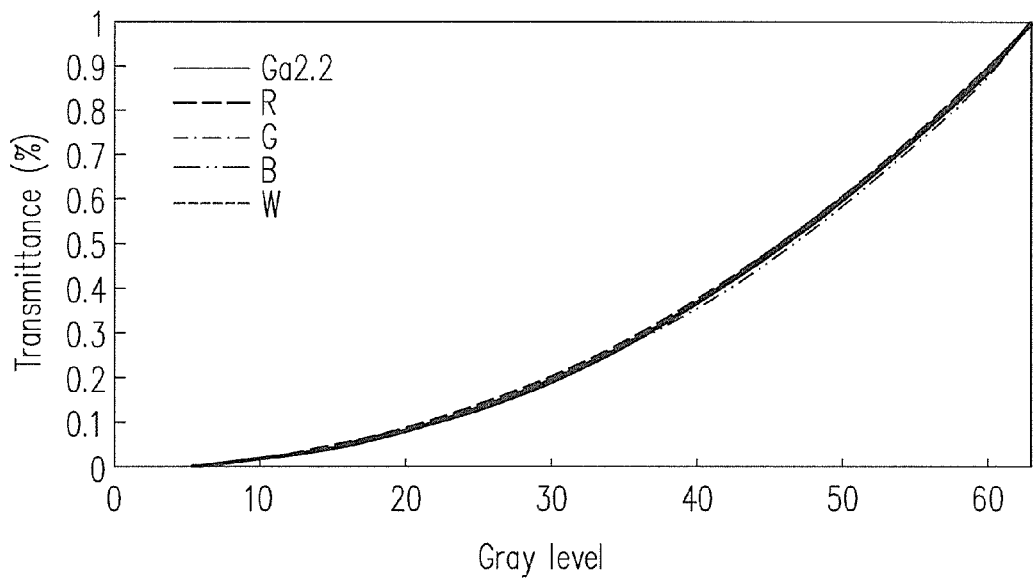
FIG. 13 is a diagram of gamma curve of one type of display panel according to one embodiment of the present invention.

FIG. 13 is a diagram of gamma curves of one type of display panel according to one embodiment of the present invention. Referring to FIG. 13, the display device of this embodiment includes the at least four color sub-pixels, wherein the thickness of the display medium of at least four color sub-pixels has been appropriately designed and adjusted. The at least four color sub-pixels of this embodiment of the present invention is RGBW in which the mixture color is white (transparent) color as an example. However, it should be appreciated that the present invention is not limited as such. More particularly, the thickness of display medium of the red color sub-pixel is TR=4.2 μm, for example; the thickness of display medium of the green color sub-pixel is TG=3.8 μm, for example; the thickness of display medium of the blue color sub-pixel is TB=3.5 μm, for example; the thickness of display medium of the white (transparent) color sub-pixel is TW=3.8 μm, for example. The thicknesses of the display medium described in the various embodiments, which are not to be construed as limiting the scope of the present invention, are for illustration purposes. The X-axis represents the gray level, while the Y-axis represents the light transmittance. As the gamma curve of the normally white is adjusted to γ=2.2, the gamma curves of the least four colors sub-pixels, for example, RGBW, are almost equal to 2.2 (γ=2.2).

From the results in FIGS. 10 to 13, by adjusting the thickness of the display medium at each sub-pixel, the gamma curves of the at least four colors sub-pixels are almost al equal to 2.2 (γ=2.2). Hence, the image quality is also better.

Moreover, to obtain a better image quality, the relationship between the thicknesses of the display medium of the least four colors sub-pixels of the display device is: TR>TG>TB and TR>TW>TB. Accordingly, the Voltage-Transmittance curve (V-T curve) of each sub-pixel is closer to each other in order for the gamma curve of each sub-pixel to be much closer to each other for a better image quality. The present invention is not limited to the height (thickness) relationship between TG and TW. Asides from TG=TW in the embodiment of FIG. 13, TG can be greater than TW or smaller than TW, as illustrated in the examples in FIGS. 14 and 15.

Figure 14:
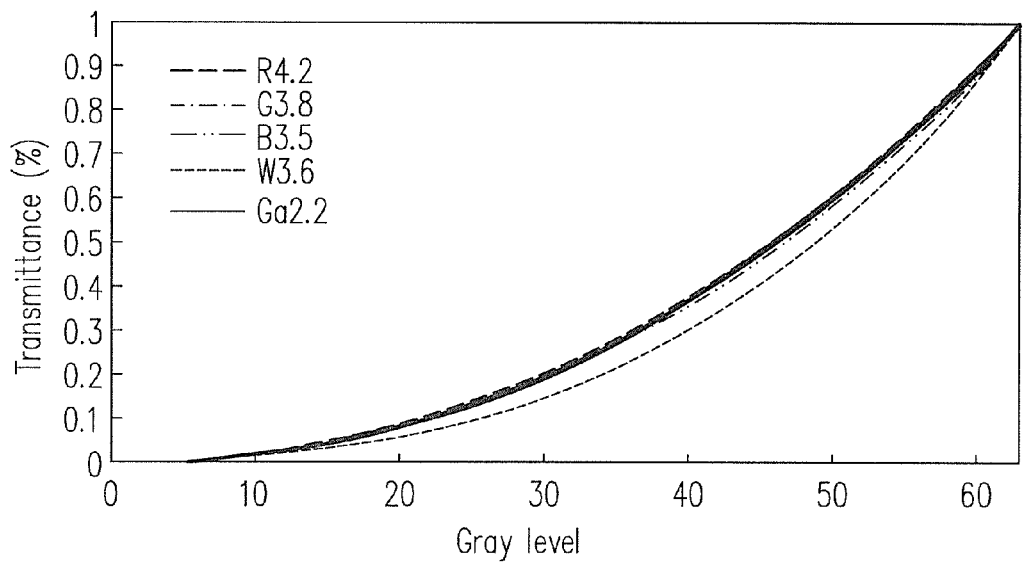
FIGS. 14 and 15 are diagrams of gamma curves of a display panel, wherein the thicknesses of the display medium at the different color sub-pixels are different.
Figure 15:
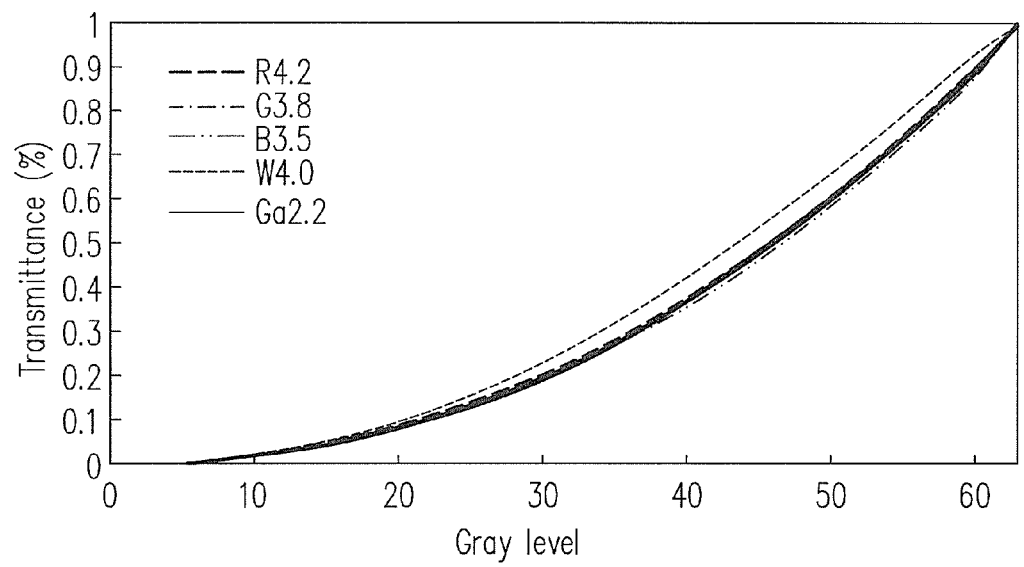
Figure 16:
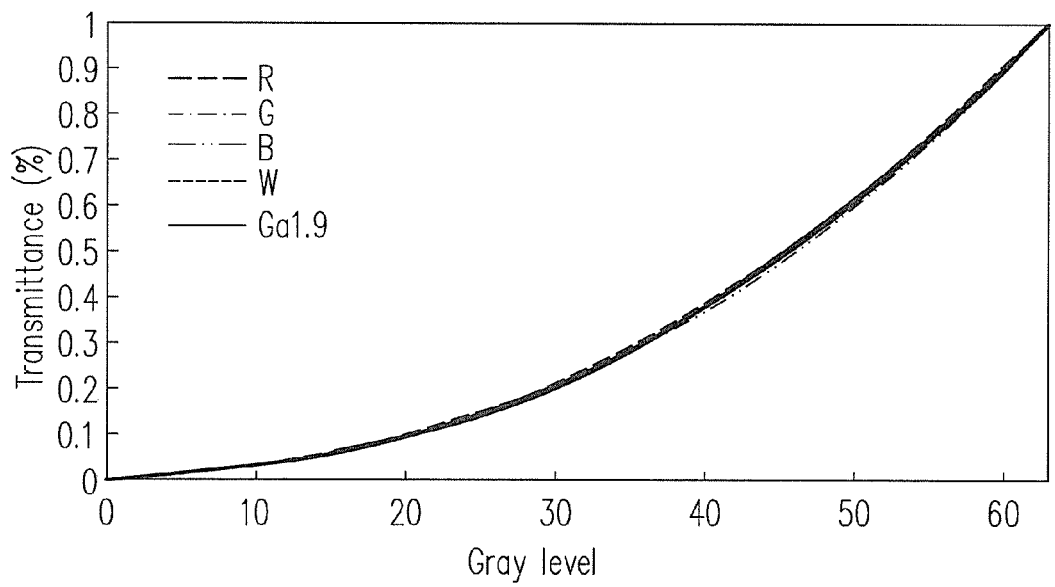
FIGS. 16 to 21 are diagrams of gamma curves of normally white being respectively adjusted to $\gamma=1.9, 2.0, 2.1, 2.3, 2.4, 2.5$.
Figure 17:
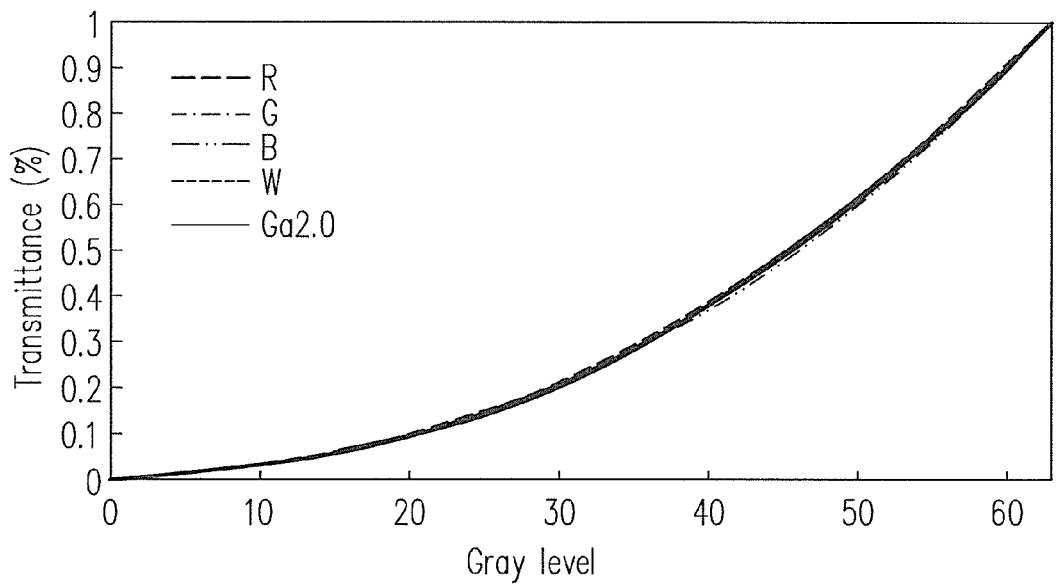
Figure 18:
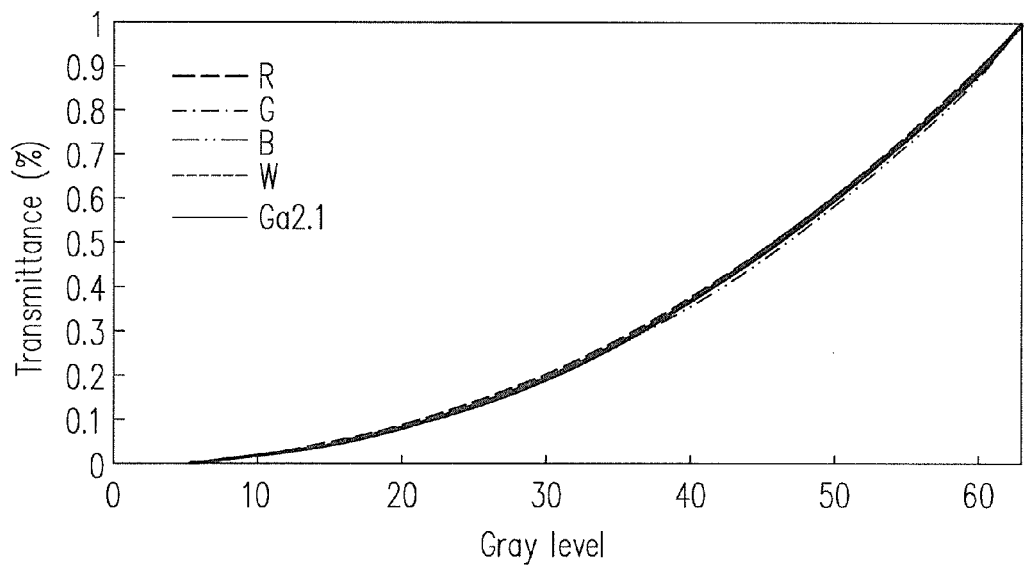
Figure 19:
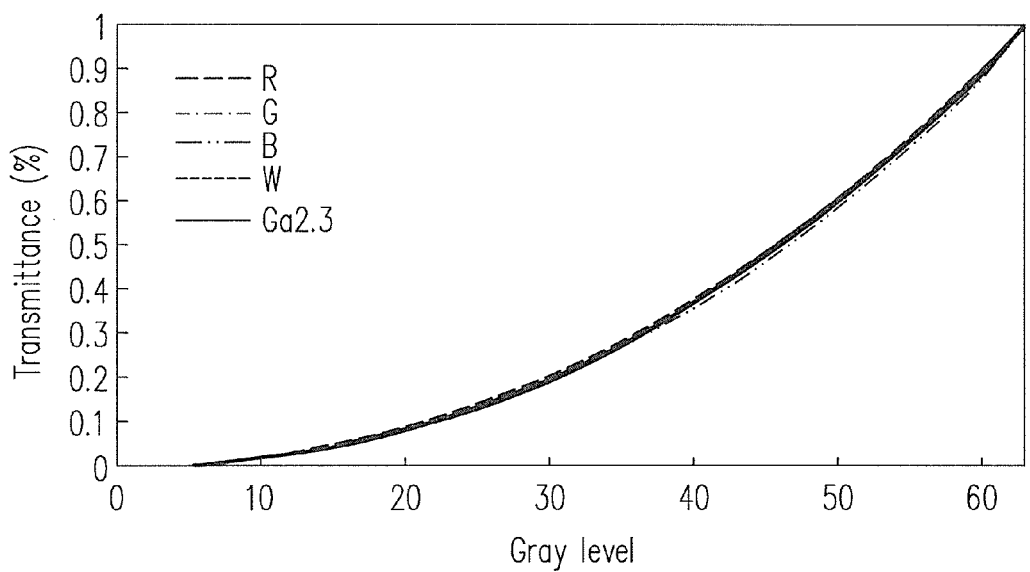
Figure 20:
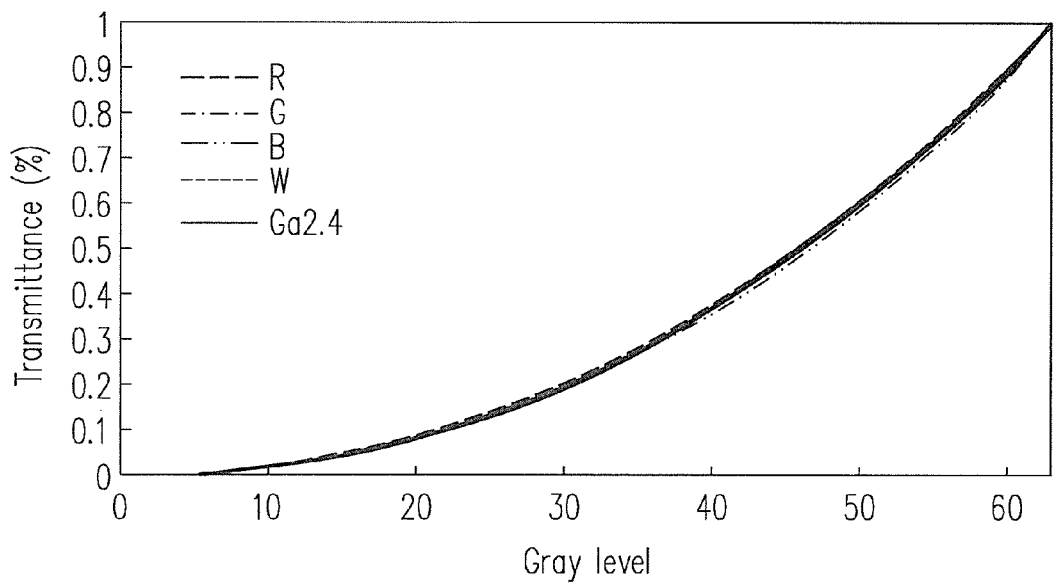
Figure 21:
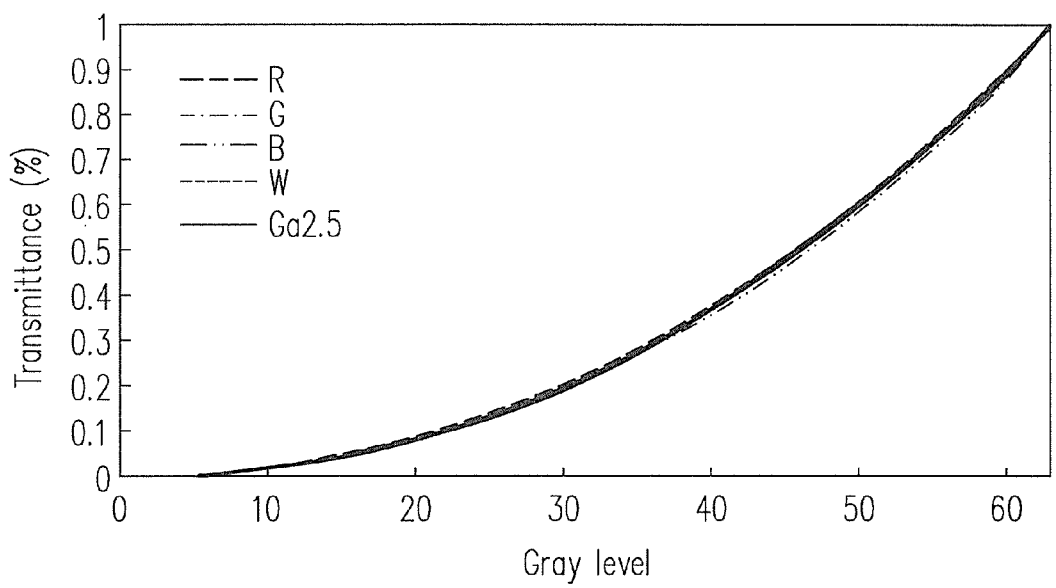

FIGS. 14 and 15 are diagrams of gamma curves of a display panel, wherein the thicknesses of the display medium of the color sub-pixels are different. As shown in FIG. 14, the thickness of the display medium of each color pixel of a display device is appropriately designed and adjusted, for example, TR=4.2 μm, TG=3.8 μm, TB=3.5 μm, TW=3.6 μm. In other words, TR>TG>TB, TR>TW>TB, and TG>TW. Similarly, as the gamma curve of the normally white is adjusted to γ=2.2, the voltage-transmittance curves of the three-primary color pixels RGB approach γ=2.2, and the voltage-transmittance curve of the transparent (white) pixel W is slightly lower than the gamma curves of the three-primary color sub-pixels RGB.

Referring to FIG. 15, the thicknesses of the display medium of the at least four colors sub-pixels of a display device are appropriately designed and adjusted. In this embodiment of the present invention, the at least four colors sub-pixels, which are not to be construed as limiting the scope of the present invention, are RGBW, for example, in which the mixture color is the white color. More particularly, TR=4.2 μm, TG=3.8 μm, TB=3.5 μm, while TW=4.0 μm, for example. In other words, TR>TG>TB, TR>TW>TB, and TG<TW. The X-axis represents the gray level, while the y-axis represents light transmittance. As the gamma curve of the normally white is adjusted to γ=2.2, the voltage-transmittance curves of the three-primary colors sub-pixels RGB are substantially overlapped and the gamma curves thereof approach γ=2.2, and the gamma curve of the transparent (white) sub-pixel is slightly higher than the gamma curves of three-primary colors sub-pixels RGB.

Moreover, although in the previous exemplary embodiments, γ=2.2 is used as an example, the present invention is not limited to γ=2.2 for achieving a better image quality. In other words, γ may be 1.9, 2.0, 2.1, 2.3, 2.4, 2.5 or other suitable constants, examples of which are illustrated in the accompanying drawings FIGS. 16 to 21.

FIGS. 16 to 21 are diagrams of gamma curves of normally white being respectively adjusted to γ=1.9, 2.0, 2.1, 2.3, 2.4, 2.5. It is apparent from FIGS. 16 to 21 that by adjusting the display medium thickness of each sub-pixel according to the present invention, no obvious deviation of the gamma curve of each color sub-pixel is observed. Hence, color shift is mitigated and image quality is enhanced.

Figure 22:
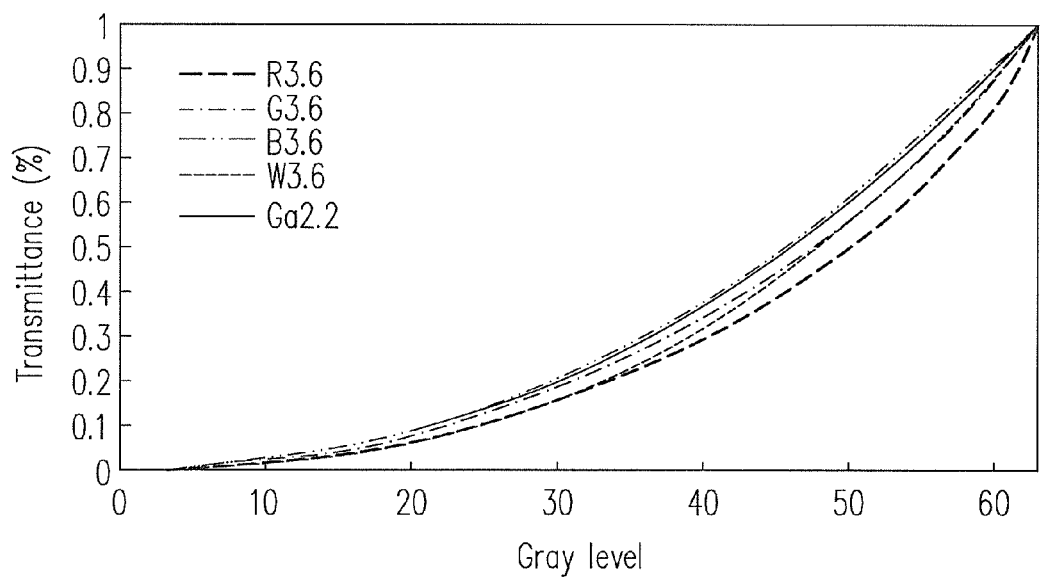
FIG. 22 is a diagram of gamma curves, wherein as the gamma curve of the normally white is adjusted to $\gamma=2.2$, TR=TG=TB=TW=3.6 µm.
Figure 23:
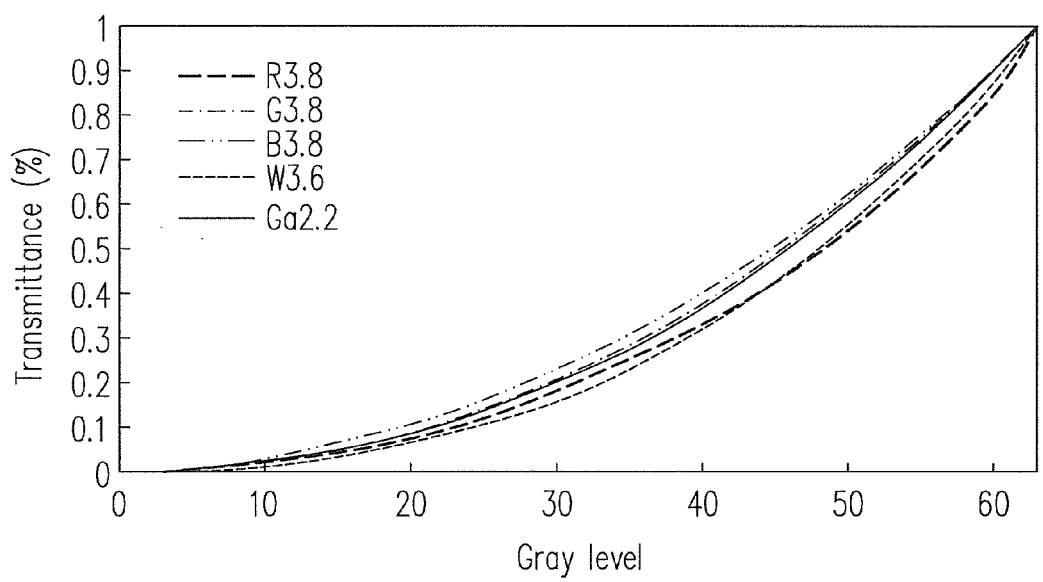
FIG. 23 is a diagram of gamma curves, wherein as the gamma curve of the normally white is adjusted to $\gamma=2.2$, TR=TG=TB=3.8 µm and TW=3.6 µm.

FIG. 22 is a diagram of gamma curves as TR=TG=TB=TW=3.6 μm when the gamma curve of normally white is adjusted to γ=2.2. FIG. 23 is a diagram of gamma curves as TR=TG=TB=3.8 μm and TW=3.6 μm when the gamma curve of normally white is adjusted to γ=2.2. It is apparent form FIGS. 22 to 23 that when the thickness of the display medium of the three sub-pixels, for example, RGB, and the thickness of display medium of the fourth sub-pixel, for example, W sub-pixel, have not been specifically designed and adjusted, the gamma curve of each color sub-pixel apparently deviates from γ=2.2.

Moreover, the adjustment of the thickness of the display medium of the above at least four colors sub-pixels, for example, red, green, blue, transparent (RGBW) color sub-pixels, color shift of the display device is mitigated while the image quality is improved. However, the reduction of color shift and the improvement of image quality on other color pixels such as, yellow, green, blue and transparent are limited. In other words, when the mixture color of the at least three of the four (the first to the fourth) sub-pixels is not actually equal to white (transparent), the reduction of color shift and the improvement of image quality is limited or completely ineffective, which can be better understood by way of the following exemplary embodiments illustrated in FIGS. 24 to 25.

Figure 24:
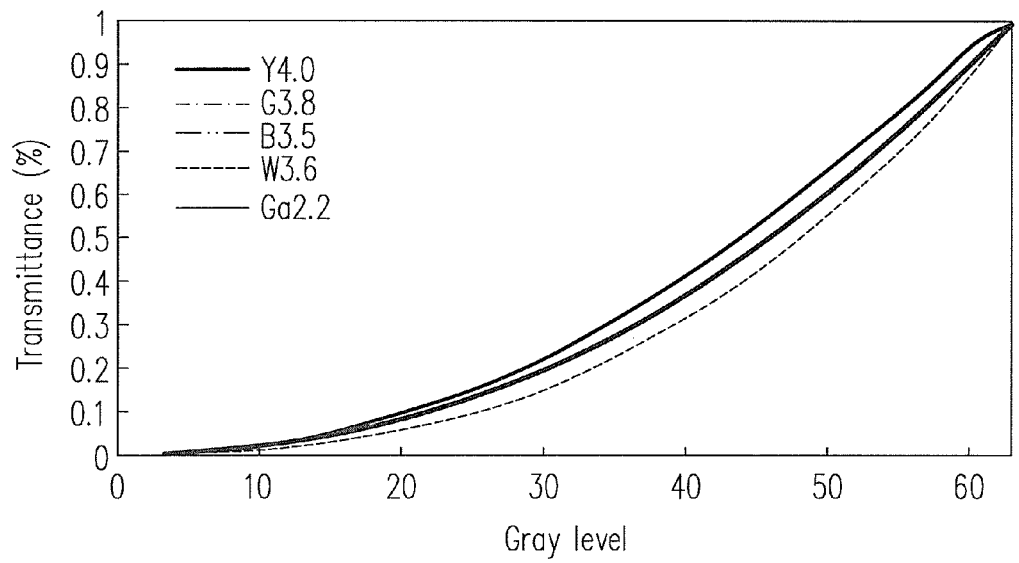
FIG. 24 is a diagram of gamma curves, wherein as the gamma curve of the normally white is adjusted to $\gamma=2.2$, TY>TG>TB and TY>TW>TB.
Figure 25:
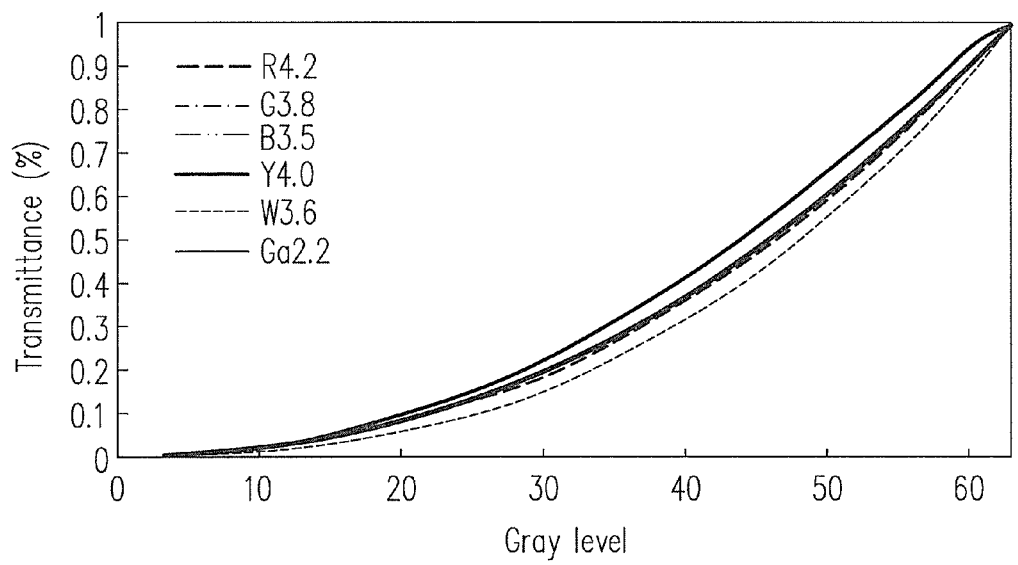
FIG. 25 is a diagram of gamma curves, wherein as the gamma curve of the normally white is adjusted to $\gamma=2.2$, TR>TG>TB and TY>TW>TB.

FIG. 24 is a diagram of gamma curves when TY>TG>TB and TY>TW>TB, wherein the gamma curve of the normally white is adjusted to γ=2.2, and the thickness of the display medium of the yellow color pixel is TY=4.0 μm, the thickness of the display medium of the green color pixel is TG=3.8 μm, the thickness of the display medium of the blue color pixel is TB=3.5 μm, the thickness of the display medium of the transparent (white) color pixel is TW=3.5 μm, for example. FIG. 25 is a diagram of gamma curves when TR>TG>TB and TY>TW>TB, wherein the gamma curve of the normally white is adjusted to γ=2.2, and TR=4.2 μm, TG=3.8 μm, TY=4.0 μm, TW=3.6 μm, for example. Referring to FIG. 24, as the gamma curve of the normally white is adjusted to γ=2.2, the range of color space displaced by the display device comprising the four colors sub-pixels YGBW is smaller than that displaced by the display device comprising the four colors sub-pixels RGBW. In other words, fewer colors are being displayed. If in the display device comprising the four colors sub-pixels YGBW, a red color sub-pixel R is additionally included, as shown in FIG. 25, the overall chrominance at the red color display is slightly better than that in FIG. 24. However, in both FIGS. 24 and 25, the gamma curve of each sub-pixel is still not focused at γ=2.2.

Figure 26:
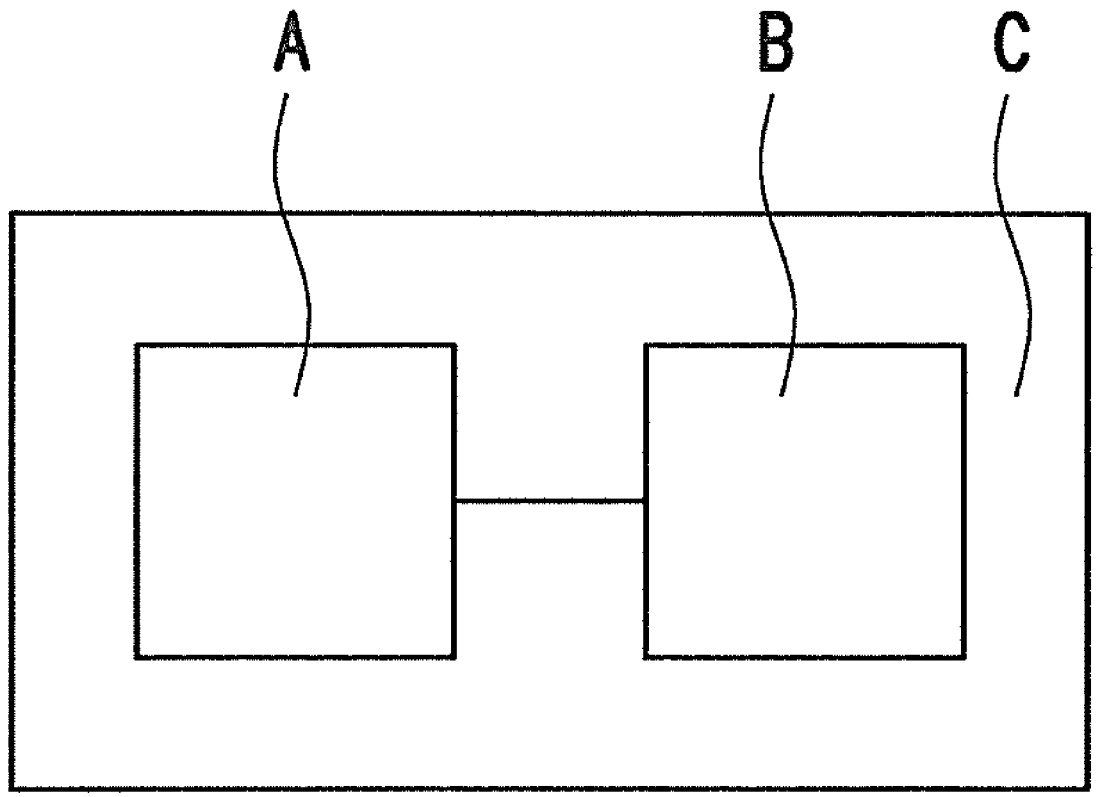
FIG. 26 a schematic diagram of an optical apparatus according to one exemplary embodiment of the present invention.

FIG. 26 is a schematic diagram of an optical apparatus according to one exemplary embodiment of the present invention. Referring to FIG. 26, the display panel A may electrically connect with electronic device B to form an electro-optical device C. The display panel A includes one of the above-mentioned panels 100, 200, 300, 400, 500, 600, 700, 800, and 900. The fabrication method of the display panel A includes the fabrication method of the above panel 100, 200, 300, 400, 500, 600, 700, 800 or 900. Wherein the type of the display panel A is based on the type of the display media layer, such as the display media layer comprises liquid crystal material and the display panel A comprises liquid crystal display panel (such as two dimension liquid crystal display panel, three dimension (3D) liquid crystal display panel, blue phase liquid crystal display panel, touchable liquid crystal display panel, or other suited liquid crystal display panel), the display media layer comprises self-luminescent material and the display panel A comprises self-luminescent display panel (such as little molecules self-luminescent display panel, medium molecules self-luminescent display panel, high molecules self-luminescent display panel, or other suited self-luminescent display panel), the display media layer comprises electrophoresis materials and the display panel A comprises electrophoresis display panel (such as electrophoresis display panel, touchable electrophoresis display panel, E-Paper, or other suited d electrophoresis display panel), or other suited materials of the display media layer, or combination thereof. Further, in accordance to the fabrication procedure of each type of electronic device B, a display device is assembled to obtain an electro-optical device.

Moreover, the electronic device B includes, for example, a control device, an operation device, a treatment device, an input device, a memory device, a driving device, a light emitting device, a protection device, a sensing device, a detecting device, other devices having other functions, or the combination thereof. The electro-optical device C includes, but not limited to, a portable product (such as a mobile phone, a camcorder, a camera, a notebook computer, a game player, a watch, a music player, an e-mail receiver and sender, a map navigator, a digital picture, or the like), an audio-video product (e.g., an audio-video player or the like), a screen, a television, an outdoor/indoor bulletin, a panel in a projector.

In accordance to the present invention, by adjusting the thickness of the display medium of each sub-pixel of the display panel, the voltage-transmittance curve of each sub-pixel is substantially closer to each other. Further, subsequent to adjustment, the gamma curves are also much closer to provide a better image quality.

Although the disclosure herein refers to certain illustrated embodiments, it is to be understood that these embodiments are presented by way of example and not by way of limitation. The intent of the detailed description is to cover all modifications, alternatives, and equivalents as may fall within the spirit and scope of the present invention as defined by the appended claims. Moreover, any embodiment of the present invention or claims to achieve all the features, advantages or characteristics disclosed in the present invention. Additionally, the abstract and the title of the present invention are intended to facilitate patent search and not intended to be restrictive of the spirit and scope of the present invention.

What is claimed is:

1. A display panel comprising:
a pair of substrates, wherein the pair of substrates comprises a plurality of pixels, and each pixel at least comprises a first sub-pixel, a second sub-pixel, a third sub-pixel, and a fourth sub-pixel;
a color filter layer, disposed over one of the pair of substrates, wherein the color filter layer at least comprises a first color filter pattern positioned at the first sub-pixel, a second color filter pattern positioned at the second sub-pixel, a third color filter pattern positioned at the third sub-pixel, and a fourth color filter pattern positioned at the fourth sub-pixel; and
a display medium, disposed between the pair of substrates, wherein the display medium comprises a first thickness (T1) at the first sub-pixel, a second thickness (T2) at the second sub-pixel, a third thickness (T3) at the third sub-pixel, a fourth thickness (T4) at the fourth sub-pixel, wherein T1>T2>T3 and T1>T4>T3.

2. The display panel of claim 1, wherein thickness of the first color filter pattern, the second color filter pattern, the third color filter pattern, and the fourth color filter pattern are respectively t1, t2, t3, and t4, wherein t1<t2<t3, and t1<t4<t3.

3. The display panel of claim 1, further comprising an overcoat layer covering the color filter layer.

4. The display panel of claim 3, wherein the overcoat layer disposed at the fourth sub-pixel serves as a color filter pattern of the fourth sub-pixel.

5. The display panel of claim 3, wherein thickness of overcoat layer at the first sub-pixel, the second sub-pixel, the third sub-pixel and the fourth sub-pixel are respectively t1', t2', t3', and t4', wherein t1'<t2'<t3', and t1'<t4'<t3'.

6. The display panel of claim 3, further comprising another overcoat layer, the overcoat layer and the another overcoat layer are disposed on different substrates, wherein thickness of the another overcoat layer at the first sub-pixel, the second sub-pixel, the third sub-pixel and the fourth sub-pixel are respectively h1, h2, h3 and h4, wherein h1<h2<h3 and h1<h4<h3.

7. The display panel of claim 3, further comprising another overcoat layer, wherein the another overcoat layer and the color filter layer are disposed on the same substrate.

8. The display pane of claim 7, wherein thickness of the another overcoat layer at the first sub-pixel, the second sub-pixel, the third sub-pixel and the fourth sub-pixel are respectively h1, h2, h3 and h4, wherein h1<h2<h3 and h1<h4<h3.

9. A method of fabricating a display panel, the method comprising:
    providing a pair of substrates, wherein the pair of substrates comprises a plurality of pixels, and each pixel at least comprises a first sub-pixel, a second sub-pixel, a third sub-pixel and a fourth sub-pixel;
    disposing a color filter layer over one of the pair of substrates, wherein the color filter layer at least comprises a first color filter pattern positioned at the first sub-pixel, a second color filter pattern positioned at the second sub-pixel, a third color filter pattern positioned at the third sub-pixel, and a fourth color filter pattern positioned at the fourth sub-pixel; and
    disposing a display medium between the pair of substrates, wherein the display medium comprises a first thickness (T1) at the first sub-pixel, a second thickness (T2) at the second sub-pixel, a third thickness (T3) at the third sub-pixel, a fourth thickness (T4) at the fourth sub-pixel, wherein T1>T2>T3 and T1>T4>T3.

10. The method of claim 9, wherein thickness of the first color filter pattern, the second color filter pattern, the third color filter pattern, and the fourth color filter pattern are respectively t1, t2, t3, and t4, wherein t1<t2<t3, and t1<t4<t3.

11. The method of claim 9, further comprising covering the color filter layer with an overcoat layer.

12. The method of claim 11, wherein the overcoat layer disposed at the fourth sub-pixel serves as a color filter pattern of the fourth sub-pixel.

13. The method of claim 11, wherein thickness of overcoat layer at the first sub-pixel, the second sub-pixel, the third sub-pixel and the fourth sub-pixel are respectively t1', t2', t3', and t4', wherein t1'<t2'<t3', and t1'<t4'<t3'.

14. The method of claim 11, further comprising forming another overcoat layer, wherein the overcoat layer and the another overcoat layer are disposed on the different substrates, wherein thickness of the another overcoat layer at the first sub-pixel, the second sub-pixel, the third sub-pixel and the fourth sub-pixel are respectively h1, h2, h3 and h4, wherein h1<h2<h3 and h1<h4<h3.

15. The method of claim 11, further comprising forming another overcoat layer, wherein the another overcoat layer and the color filter layer are disposed on the same substrate.

16. The method of claim 15, wherein thicknesses of the another overcoat layer at the first sub-pixel, the second sub-pixel, the third sub-pixel and the fourth sub-pixel are respectively h1, h2, h3 and h4, wherein h1<h2<h3 and h1<h4<h3.

17. An electro-optical apparatus comprising the display panel according to the display panel of claim 1.

18. A method of fabricating an electro-optical apparatus according to the method of fabricating the display pane of claim 9.

* * * * *